United States Patent
Sampei et al.

(10) Patent No.: US 9,459,943 B2
(45) Date of Patent: Oct. 4, 2016

(54) FAULT ISOLATION BY COUNTING ABNORMALITIES

(71) Applicant: FUJITSU LIMITED, Kawasaki-shi, Kanagawa (JP)

(72) Inventors: Akira Sampei, Kawasaki (JP); Fumio Hanzawa, Yokohama (JP); Hiroaki Sato, Yokohama (JP); Tsunemichi Harada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/256,077

(22) Filed: Apr. 18, 2014

(65) Prior Publication Data

US 2014/0344630 A1 Nov. 20, 2014

(30) Foreign Application Priority Data

May 16, 2013 (JP) .................................. 2013-104098

(51) Int. Cl.
*G06F 11/00* (2006.01)
*G06F 11/07* (2006.01)

(52) U.S. Cl.
CPC ......... *G06F 11/0727* (2013.01); *G06F 11/076* (2013.01); *G06F 11/079* (2013.01)

(58) Field of Classification Search
None
See application file for complete search history.

(56) References Cited

U.S. PATENT DOCUMENTS

| | | | | | |
|---|---|---|---|---|---|
| 4,380,067 | A * | 4/1983 | Beardsley | ................ | G06F 11/20 714/4.1 |
| 5,923,247 | A * | 7/1999 | Dowden | ............. | H04L 41/0681 340/500 |
| 6,816,461 | B1 * | 11/2004 | Scrandis | ............. | H04L 12/2602 370/242 |
| 7,779,306 | B1 * | 8/2010 | Philbin | ............... | G06F 11/0727 370/216 |
| 8,069,370 | B1 * | 11/2011 | Li | ........................ | G06F 11/0709 714/26 |
| 2002/0194524 | A1 * | 12/2002 | Wiley | .................. | H04L 1/0061 714/4.5 |
| 2003/0056153 | A1 * | 3/2003 | Beer | ................... | H04L 41/0677 714/43 |
| 2006/0101308 | A1 * | 5/2006 | Agarwal | ............. | G06F 11/0709 714/25 |
| 2008/0010494 | A1 * | 1/2008 | Takizawa | ............ | G06F 11/0766 714/5.1 |
| 2009/0290247 | A1 | 11/2009 | Ito et al. | ......................... | 360/31 |
| 2012/0005534 | A1 * | 1/2012 | Li | ........................ | G06F 11/008 714/26 |

FOREIGN PATENT DOCUMENTS

| | | |
|---|---|---|
| JP | 1-271828 | 10/1989 |
| JP | 11-353819 | 12/1999 |
| JP | 2009-170034 | 7/2009 |
| JP | 2009-282848 | 12/2009 |

* cited by examiner

*Primary Examiner* — Gabriel Chu
(74) *Attorney, Agent, or Firm* — Staas & Halsey LLP

(57) ABSTRACT

An information processing device includes a plurality of components and a processor. The processor is configured to measure, upon detection of abnormalities in first components among the plurality of components, a number of abnormalities that occur in each of the first components. The processor is configured to measure an access processing value in each of the first components. The access processing value represents an amount of a predetermined feature relating to each of the first components. The processor is configured to calculate a ratio of the number of abnormalities to the access processing value in each of the first components. The processor is configured to identify a component as a fault location based on the calculated ratios.

17 Claims, 5 Drawing Sheets

| COMPONENT | NUMBER OF ABNORMALITIES | ACCESS PROCESSING VALUE |
|---|---|---|
| CM#0 | 0 | 0 |
| CM#1 | 0 | 0 |
| ROUTER#0 | 0 | 0 |
| ROUTER#1 | 0 | 0 |
| STORAGE DEVICE#0 | 0 | 0 |
| STORAGE DEVICE#1 | 0 | 0 |
| STORAGE DEVICE#2 | 0 | 0 |
| THRESHOLD | 10 TIMES | 100GB |

| COMPONENT | NUMBER OF ABNORMALITIES | ACCESS PROCESSING VALUE |
|---|---|---|
| CM#0 | 0 | 0 |
| CM#1 | 0 | 0 |
| ROUTER#0 | 0 | 0 |
| ROUTER#1 | 0 | 0 |
| STORAGE DEVICE#0 | 0 | 0 |
| STORAGE DEVICE#1 | 0 | 0 |
| STORAGE DEVICE#2 | 0 | 0 |

| THRESHOLD | 10 TIMES | 100GB |
|---|---|---|

| COMPONENT | NUMBER OF ABNORMALITIES | ACCESS PROCESSING VALUE |
|---|---|---|
| CM#0 | 0→+1 | 0→ BEGIN MEASUREMENT |
| CM#1 | 0 | 0 |
| ROUTER#0 | 0→+1 | 0→ BEGIN MEASUREMENT |
| ROUTER#1 | 0 | 0 |
| STORAGE DEVICE#0 | 0→+1 | 0→ BEGIN MEASUREMENT |
| STORAGE DEVICE#1 | 0 | 0 |
| STORAGE DEVICE#2 | 0 | 0 |

| THRESHOLD | 10 TIMES | 100GB |

FAULT ISOLATION BY COUNTING ABNORMALITIES

CROSS-REFERENCE TO RELATED APPLICATION

This application is based upon and claims the benefit of priority of the prior Japanese Patent Application No. 2013-104098, filed on May 16, 2013, the entire contents of which are incorporated herein by reference.

FIELD

The embodiments discussed herein are related to an information processing device and a control device.

BACKGROUND

In recent redundant arrays of inexpensive disks (RAID) controllers, the numbers of parts used therein have been continuously increasing, and the configurations thereof have been becoming more complex. In particular, in an enterprise class RAID controller, redundancy of communication paths between the controller and storage devices is achieved and a plurality of relay nodes such as routers are implemented, resulting in a complex configuration. Approaches for identifying a fault location, which is a cause of occurrence of an error in access operation to a storage device, in a RAID controller having such a configuration are known.

For example, an approach in which an error point value is added for a storage device in which an error has occurred, and a storage device whose error point values have reached a threshold is identified as a fault location is known. In this approach, when a predetermined error monitoring period has elapsed, the error point values are reset.

Related techniques are disclosed in, for example, Japanese Laid-open Patent Publication No. 2009-282848, Japanese Laid-open Patent Publication No. 2009-170034, Japanese Laid-open Patent Publication No. 11-353819, and Japanese Laid-open Patent Publication No. 1-271828.

In the aforementioned approach for identifying a fault location, however, there is a problem in that any storage device may be merely identified as a fault location, and a control module (CM) or a router is not identified when the CM or the router is a fault location. There is another problem in that if the error point values at a plurality of error occurrence locations are the same, a fault location is not identified.

SUMMARY

According to an aspect of the present invention, provided is an information processing device including a plurality of components and a processor. The processor is configured to measure, upon detection of abnormalities in first components among the plurality of components, a number of abnormalities that occur in each of the first components. The processor is configured to measure an access processing value in each of the first components. The access processing value represents an amount of a predetermined feature relating to each of the first components. The processor is configured to calculate a ratio of the number of abnormalities to the access processing value in each of the first components. The processor is configured to identify a component as a fault location based on the calculated ratios.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Hereinafter, an information processing device and a control device according to a first embodiment will be described with reference to the accompanying drawings. The embodiment described below is merely exemplary and is in no way intended to exclude various modifications and technical applications that are not explicitly described in the embodiment. That is, this embodiment may be modified in various forms without departing from the spirit and scope thereof.

The drawings do not purport to only include elements illustrated therein but may include other functions or the like.

System Configuration

Figure 1:
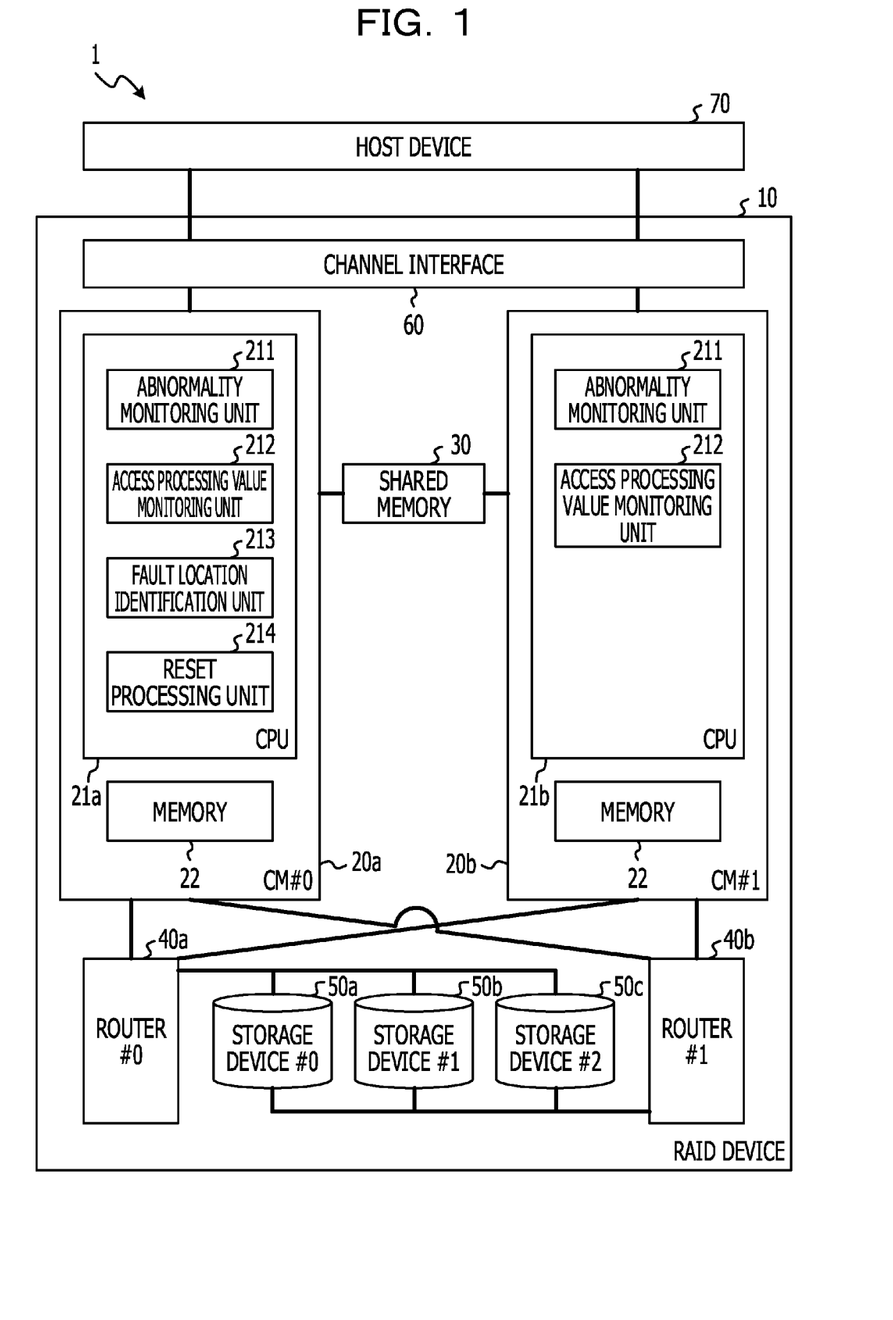
FIG. 1 illustrates an exemplary functional configuration of a storage system according to an embodiment.

FIG. 1 illustrates a functional configuration of a storage system according to a first embodiment.

Hereinafter, in the drawings, the similar portions are denoted by similar reference numerals and redundant description thereof is omitted.

A storage system 1 according to the first embodiment includes a RAID device (information processing device) 10 and a host device 70 as illustrated in FIG. 1.

As illustrated in FIG. 1, the RAID device 10 and the host device 70 are communicably connected to each other, for example, over a local area network (LAN).

The host device 70 is, for example, a computer having a server function. In an example illustrated in FIG. 1, one host device 70 is included; however, two or more host devices 70 may be included.

The RAID device 10 includes a plurality of (two in the example illustrated in FIG. 1) CMs (control devices) 20a and 20b, a shared memory 30, a plurality of (two in the example illustrated in FIG. 1) routers 40a and 40b, a plurality of (three in the example illustrated in FIG. 1) storage devices 50a to 50c, and a channel interface 60. This RAID device 10 virtually manages the plurality of storage devices 50a to 50c as one storage device to provide a storage area for the host device 70.

Hereinafter, as reference numerals denoting CMs, a reference numeral "20a" or "20b" will be used when it is desired that one of a plurality of CMs be identified, and a reference numeral "20" will be used when an arbitrary CM is referred to. Also, hereinafter, as reference numerals denoting routers, a reference numeral "40a" or "40b" will be used when it is desired that one of a plurality of routers be identified, and a reference numeral "40" will be used when an arbitrary router is referred to. Additionally, hereinafter, as reference numerals denoting storage devices, a reference numeral "50a", "50b", or "50b" will be used when it is desired that one of a plurality of storage devices be identified, and a reference numeral "50" will be used when an arbitrary storage device is referred to.

Hereinafter, the CM 20a may be referred to as CM#0, and the CM 20b may be referred to as CM#1. Also, hereinafter, the router 40a may be referred to as a router#0, and the router 40b may be referred to as a router#1. Additionally, hereinafter, the storage device 50a may be referred to as a storage device#0, the storage device 50b as a storage device#1, and the storage device 50c as a storage device#2.

As illustrated in FIG. 1, the CM 20 and the channel interface 60, the CM 20 and the shared memory 30, the CM 20 and the router 40, and the router 40 and the storage device 50 are communicably connected to each other, respectively, for example, by bus lines.

Note that the numbers of CMs 20, routers 40, and storage devices 50 included in the RAID device 10 are not limited to those in FIG. 1, and, for example, larger or smaller numbers of CMs 20, routers 40, and storage devices 50 than those illustrated in FIG. 1 may be included.

Hereinafter, the CMs 20, the routers 40, and the storage devices 50 may be referred to collectively as components of the RAID device 10 or simply as components. This RAID device 10 has functions of detecting abnormalities in these components, and identifying a fault location among the components where the abnormalities have been detected.

The channel interface 60 is an interface controller communicably connected to the host device 70. The channel interface 60 receives data sent from the host device 70 and delivers the data to the CM 20, and sends data received from the CM 20 to the host device 70.

The router 40 is a known device that relays data between the CM 20 and the storage device 50. These routers 40 have functional configurations that are similar to each other.

The storage device 50 is a known device that stores data therein in such a manner that the data is readable and writable, and is, for example, a hard disk drive (HDD) or a solid state drive (SSD). These storage devices 50 have functional configurations that are similar to one another.

In an example of the first embodiment, the CM#0 is configured in a redundant manner such that the CM#0 may access each storage device 50 via the router#0 or the router#1, the CM#1 is configured in a redundant manner such that the CM#1 may access each storage device 50 via the router#0 or the router#1.

Figure 2:
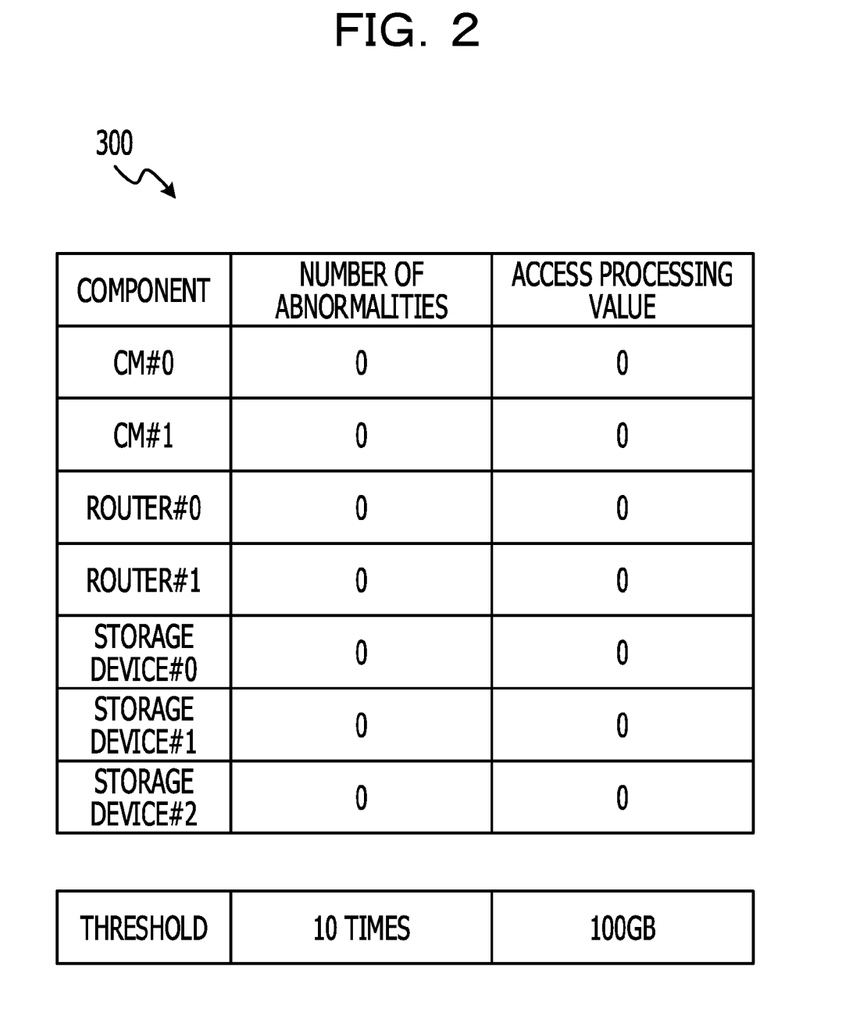
FIG. 2 is a table exemplifying shared information in a storage system according to an embodiment.

FIG. 2 is a table exemplifying shared information in the storage system according to the first embodiment.

The shared memory 30 is a storage device shared by the CM#0 and the CM#1. In an example of the first embodiment, as illustrated in FIG. 2, the shared memory 30 holds information in which the respective numbers of abnormalities and the respective access processing values (both described in detail later with reference to FIG. 3) are associated with each other as the shared information 300, for the CM#0, the CM#1, the router#0, the router#1, the storage device#0, the storage device#1, and the storage device#2, which are components of the RAID device 10. At the time of startup of the RAID device 10, both the numbers of abnormalities and the access processing values in respective components are set to "0" as initial values as illustrated in FIG. 2. The thresholds of the numbers of abnormalities and the access processing values will be described later with reference to FIG. 3.

Note that one shared memory 30 is provided outside the CMs 20 in the example illustrated in FIG. 1, but the configuration is not limited to this. For example, the CMs 20 may include respective shared memories 30, so that, through communication among the CMs 20, data stored in the shared memories 30 of the CMs 20 are synchronized with each other to be matched.

The CM 20 is a control device that performs various control operations, and performs various kinds of controls in accordance with storage access requests from the host device 70.

The CM#0 includes a central processing unit (CPU) 21a and a memory 22.

The memory 22 is a storage device including a read only memory (ROM) and a random access memory (RAM). An operating system (OS), a software program (control program) related to control for identifying a fault location, and data and the like for this program are written in the ROM of the memory 22. The software program on the memory 22 is read and executed by the CPU 21a as desired. The RAM of the memory 22 is utilized as a temporary memory or a working memory.

The CPU 21a is a processing unit that performs various controls and operations, and implements various functions by executing the OS and the program stored in the memory 22. That is, as illustrated in FIG. 1, the CPU 21a functions as an abnormality monitoring unit 211, an access processing value monitoring unit 212, a fault location identification unit 213, and a reset processing unit 214.

Note that a program (control program) for implementing functions as the abnormality monitoring unit 211, the access processing value monitoring unit 212, the fault location identification unit 213, and the reset processing unit 214 is provided, for example, in a form in which the program is recorded on a computer-readable recording medium such as a flexible disk, a compact disc (CD) such as a CD-ROM, a CD-recordable (R), a CD-read/write (RW) or the like, a digital versatile disc (DVD) such as a DVD-ROM, a DVD-RAM, a DVD-R, a DVD+R, a DVD-RW, a DVD+RW, a high definition (HD) DVD, or the like, a Blu-ray disc, a magnetic disc, an optical disc, or a magneto-optical disc. The computer reads a program via a reading device, which is not illustrated, from the recording medium, and transfers and stores the program to and in an internal recording device or an external recording device, so that the computer uses the program. In addition, the program may be recorded, for example, on a storage device (recording medium) such as a magnetic disc, an optical disc, or a magneto-optical disc, and may be provided from the storage device through a communication path to the computer.

At the time of implementing functions as the abnormality monitoring unit 211, the access processing value monitoring unit 212, the fault location identification unit 213, and the reset processing unit 214, a program stored in an internal storage device (the memory 22 in the first embodiment) is executed by a microprocessor (the CPU 21a in the first embodiment) of the computer. At this point, the computer may read and execute a program recorded on a recording medium.

Note that, in the first embodiment, the term "computer" is a concept including hardware and an OS, and refers to the hardware that operates under control of the OS. In the case where the OS is unnecessary and hardware is operated by an application program alone, the hardware itself corresponds to the computer. The hardware includes at least a microprocessor such as a CPU and a measure for reading a computer program recorded on a recording medium, and the CM 20 functions as the computer in the first embodiment.

The CM#1 is similar to the CM#0 in that the CM#1 includes the CPU 21*b* and the memory 22; however, the CPU 21*b* differs from the CPU 21*a* in that the CPU 21*b* does not function either as the fault location identification unit 213 or as the reset processing unit 214, as illustrated in FIG. 1. That is, in an example of the first embodiment, the CM#0 functions as a master CM and the CM#1 functions as a slave CM. The CPU 21*b* has a functional configuration similar to that of the CPU 21*a*, except that the CPU 21*b* does not function either as the fault location identification unit 213 or as the reset processing unit 214, and therefore details thereof will not be further described.

Figure 3:
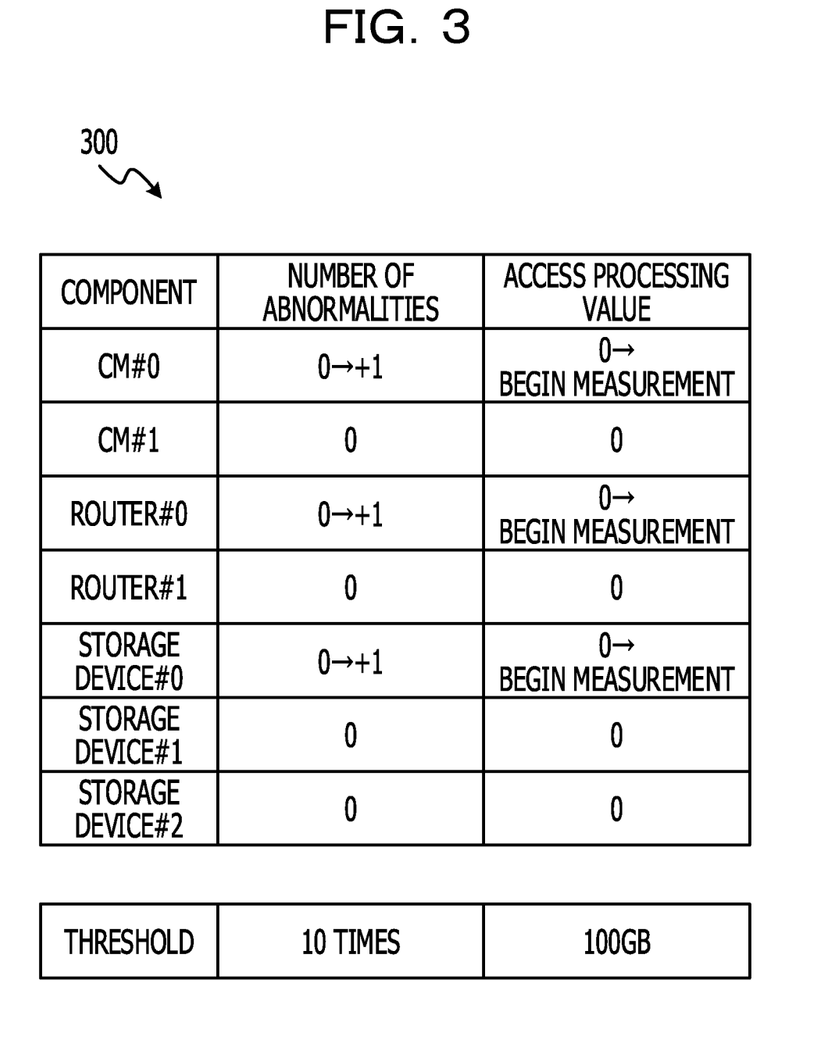
FIG. 3 is a table exemplifying an approach for measuring the number of abnormalities and access processing values in a storage system according to an embodiment.

FIG. 3 is a table exemplifying an approach for measuring the number of abnormalities and the access processing values in the storage system according to the first embodiment.

The abnormality monitoring unit 211 detects abnormalities in the components, and measures the number of abnormalities that have occurred in each component.

In particular, the abnormality monitoring unit 211 detects an abnormality that occurs in any of the CM#0, the CM#1, the router#0, the router#1, the storage device#0, the storage device#1, and the storage device#2, which are components of the RAID device 10 illustrated in FIG. 1.

The approach in which an abnormality is detected by the abnormality monitoring unit 211 is realizable with known various approaches, and therefore details thereof will not be described.

In the example illustrated in FIG. 3, abnormalities occur in the CM#0, the router#0, and the storage device#0. Abnormalities are detected in a plurality of components in such a manner, for example, in the case where the CM#0 performs access processing to the storage device#0 via the router#0. Note that the causes of the abnormalities in components lie, for example, in a circuit fault, a software error, and disconnection in a chip within the storage device 50. For example, in the case where the CM#0 performs access processing to the storage device#0 via the router#0, abnormalities are detected in the CM#0, the router#0, and the storage device#0 when a circuit fault or the like occurs in any of these components as illustrated in FIG. 3. Then, as illustrated in FIG. 3, each time the abnormality monitoring unit 211 detects such abnormalities, the abnormality monitoring unit 211 adds one to the number of abnormalities that have occurred in the each of corresponding components, that is, calculates a cumulative total, and overwrites the existing number of abnormalities with the cumulative total as the shared information 300 in the shared memory 30. The abnormality monitoring unit 211 continues to count the numbers of abnormalities until reset processing described later is performed by the reset processing unit 214.

The access processing value monitoring unit 212 measures the access processing value in each component.

In particular, when the abnormality monitoring unit 211 begins measurement of the number of abnormalities in any component, the access processing value monitoring unit 212 begins measurement of the access processing value in that component.

In the example illustrated in FIG. 3, as the abnormality monitoring unit 211 begins measurement of the numbers of abnormalities in the CM#0, the router#0, and the storage device#0, the access processing value monitoring unit 212 begins measurement of access processing values in the CM#0, the router#0, and the storage device#0. The access processing values are the amounts of data processed by components or the numbers of issued commands (Read/Write commands), for example. Hereinafter, unless otherwise noted, the access processing value will be assumed to be the amount of data processed by each component. In an example of the first embodiment, by using the amount of data processed by each component as the access processing value, it may be expected to identify a fault location with a higher accuracy. Each time the amount of data processed by each component increases, the abnormality monitoring unit 211 adds up the access processing values in the corresponding components, that is, calculates cumulative totals, and overwrites the existing access processing values with the cumulative totals as the shared information 300 in the shared memory 30. Note that the access processing value monitoring unit 212 measures not only access processing in which an abnormality is detected but also normal access processing. The access processing value monitoring unit 212 continues measurement of access processing values until reset processing is performed by the reset processing unit 214, which will be described later.

The approach in which access processing values are measured by the access processing value monitoring unit 212 may be implemented by various known approaches, and therefore details thereof will not be described.

As described above, since the abnormality monitoring unit 211 and the access processing value monitoring unit 212 are functions included in both CMs 20, both the CMs 20 perform the monitoring of abnormality and the monitoring of access processing described above, and update the shared information 300 of the shared memory 30.

In the example illustrated in FIG. 1, the RAID device 10 has a redundant configuration such that the CM#0 may access three storage devices 50 via the router#0 or the router#1 and the CM#1 may also access three storage devices 50 via the router#0 or the router#1. Accordingly, the abnormality monitoring unit 211 and the access processing value monitoring unit 212 of the CM#0 each monitor the abnormalities and access processing values in the CM#0 itself, two routers 40, and three storage devices 50. In contrast, the abnormality monitoring unit 211 and the access processing value monitoring unit 212 of the CM#1 each monitor the abnormalities and access processing values in the CM#1 itself, two routers 40, and three storage devices 50.

The fault location identification unit 213 identifies a component as the fault location, based on ratio of the number of abnormalities and the access processing value in each component.

In particular, if the number of abnormalities in any component for which measurement is performed by the abnormality monitoring unit 211 has reached the threshold, the fault location identification unit 213 calculates the ratio of the number of abnormalities to the access processing value in the component. For example, the fault location identification unit 213 calculates the ratio by dividing the number of abnormalities by the access processing value. Then, the fault location identification unit 213 identifies a component having a largest ratio as the fault location.

In the example illustrated in FIG. 3, the threshold of the number of abnormalities is set to 10 times. That is, if, in a plurality of components (candidate fault locations), the numbers of abnormalities measured by the abnormality monitoring unit 211 have simultaneously reached 10 times, which is a threshold, the fault location identification unit 213 calculates the ratio by dividing the number of abnormalities by the access processing value in each of the candidate fault locations. Then, the fault location identification unit 213 identifies, as the fault location, a candidate fault location (component) where the calculated ratio is the largest. If there is only one component (candidate fault location) where the number of abnormalities measured by the abnormality monitoring unit 211 has reached 10 times, the fault location identification unit 213 identifies the candidate fault location (component) as the fault location without calculation of the ratio. Upon identification of a fault location, the fault location identification unit 213 may cause the fault location to be displayed on a display monitor or the like, which is not illustrated, so as to be presented to an operator.

For example, for the case where the numbers of abnormalities in the CM#0, the router#0, and the storage device#0 simultaneously have reached 10 times, 10 times, and 10 times, and the access processing values in these components are 80 GB, 30 GB, and 50 GB, respectively, an approach for identifying a fault location will be described. The fault location identification unit 213 determines, as candidate fault locations, the CM#0, the router#0, and the storage device#0 where the numbers of abnormalities each have reached 10 times as the threshold exemplified in FIG. 3. The fault location identification unit 213 calculates the ratios in the CM#0, the router#0, and the storage device#0, thereby obtaining 10/80, 10/30, and 10/50, respectively. Then, the fault location identification unit 213 identifies the router#0 having a largest value of 10/30 among the calculated ratios, as the fault location.

The reset processing unit 214 performs a reset for measurement of the number of abnormalities and the access processing value.

In particular, when the access processing value in any component measured by the access processing value monitoring unit 212 has reached the threshold, the reset processing unit 214 resets, for that component, the number of abnormalities and the access processing value in the shared information 300.

In the example illustrated in FIG. 3, the threshold (unit access processing value) of the access processing value is set to 100 GB. That is, if there is a component where the access processing value measured by the access processing value monitoring unit 212 has reached a threshold of 100 GB, the reset processing unit 214 resets the number of abnormalities and the access processing value in that component in the shared information 300. Note that, in the case where the numbers of issued commands are used as the access processing values as mentioned above, a threshold number of issued commands is set as the threshold of the access processing values.

That is, the fault location identification unit 213 determines, as a candidate fault location, a component where the number of abnormalities has reached the threshold before the access processing value reaches the unit access processing value. In other words, the fault location identification unit 213 determines, as a candidate fault location, a component where the number of abnormalities per unit access processing value has reached the threshold.

Operations

An exemplary process of identifying a fault location in the storage system 1 according to the first embodiment configured as described above will be described with reference to a flowchart (S10 to S100) illustrated in FIG. 4.

The fault location identification unit 213 detects that the number of abnormalities that have occurred in any of components measured by the abnormality monitoring unit 211 has reached the threshold (S10).

The fault location identification unit 213 determines whether the number of components (candidate fault locations) where the number of abnormalities measured by the abnormality monitoring unit 211 has reached the threshold is one (S20).

If the number of candidate fault locations is one (Yes in S20), the fault location identification unit 213 identifies, as the fault location, a component where the number of abnormalities has reached the threshold (S30).

If the number of candidate fault locations is not one (No in S20), the fault location identification unit 213 calculates the ratio by dividing the number of abnormalities by the access processing value in each of the candidate fault locations.

In S40 to S100 described below, the case where the candidate fault locations are the CM#0, the router#0, and the storage device#0 will be described.

The fault location identification unit 213 determines whether the CM#0 has the largest ratio among the candidate fault locations (S40).

If the CM#0 has the largest ratio among the candidate fault locations (Yes in S40), the fault location identification unit 213 identifies the CM#0 as the fault location (S50). For example, if a normal CM#1 and a faulty CM#0 access one normal storage device#0, the process arrives at S50.

If the CM#0 does not have the largest ratio among the candidate fault locations (No in S40), the fault location identification unit 213 determines whether the router#0 has the largest ratio among the candidate fault locations (S60).

If the router#0 has the largest ratio among the candidate fault locations (Yes in S60), the fault location identification unit 213 identifies the router#0 as the fault location (S70).

If the router#0 does not have the largest ratio among the candidate fault locations (No in S60), the fault location identification unit 213 determines whether the storage device#0 has the largest ratio among the candidate fault locations (S80).

If the storage device#0 has the largest ratio among the candidate fault locations (Yes in S80), the fault location identification unit 213 identifies the storage device#0 as the fault location (S90). For example, if one normal CM#0 accesses a plurality of normal storage devices storage device#1 and storage device#2 and a faulty storage device#0, the process arrives at S90.

If the storage device#0 does not have the largest ratio among the candidate fault locations, that is, if the ratios of two or more candidate fault locations have the same value (No in S80), the fault location identification unit 213 determines that the fault location is uncertain (S100). For example, if one CM#0 accesses one storage device#0 only, the process arrives at S100. There is no access from the CM#0 to the other storage devices storage device#1 and storage device#2 and no access from the other CM CM#1 to the storage device#0, and therefore it is difficult to statistically identify the fault location. However, in a large-scale RAID device, the operation is usually performed in a RAID configuration using a plurality of storage devices. Access concentrated on only one storage device may occur in the operation of RAID-0 (one storage device), and therefore such an access is usually impossible.

If the process arrives at S30, S50, S70, S90, or S100, the exemplary process of identifying a fault location terminates.

Figure 4:
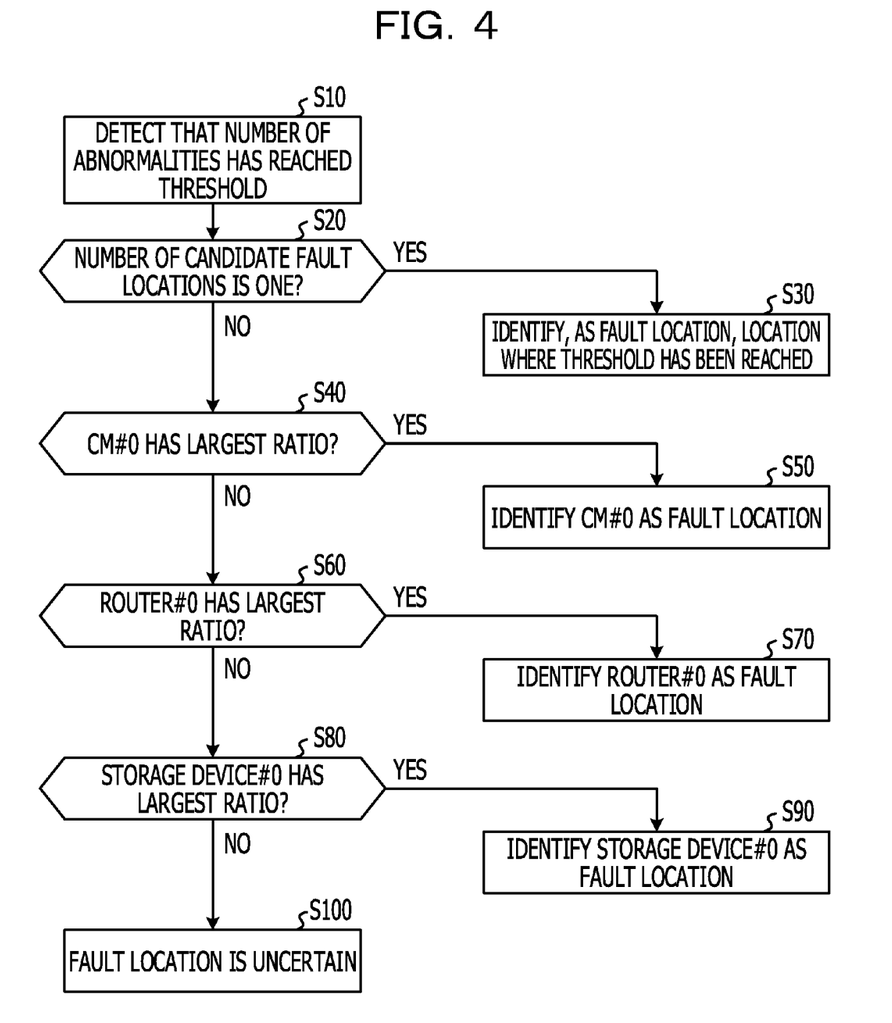
FIG. 4 is a flowchart illustrating a process of identifying a fault location in a storage system according to an embodiment.

Note that the number of determinations (S40, S60, and S80) made by the fault location identification unit 213 as to whether the ratio is the largest depends on the number of candidate fault locations and therefore is not limited to the example illustrated in FIG. 4. Also, the order of determinations (S40, S60, and S80) made by the fault location identification unit 213 as to whether the ratio is the largest is not limited to the example illustrated in FIG. 4, and the fault location identification unit 213 may make determinations in the order of S80, S60, and S40, for example. Upon identification (S30, S50, S70, and S90) of the fault location, the fault location identification unit 213 may cause that fault location to be displayed on a display monitor or the like, which is not illustrated, so as to be presented to an operator. Otherwise, upon determination that the fault location is uncertain (S100), the fault location identification unit 213 may cause a message that the fault location is uncertain to be displayed on a display monitor or the like, which is not illustrated, so as to be presented to an operator.

Next, an exemplary process of resetting the numbers of abnormalities and the access processing values in the storage system 1 according to the first embodiment configured as described above will be described with reference to a flowchart (S110 to S180) illustrated in FIG. 5. In an example illustrated in FIG. 5, the case where the RAID device 10 includes two CMs 20, two routers 40, and three storage devices 50 as components as illustrated in FIG. 1 will be described.

The reset processing unit 214 detects that the access processing value in any component measured by the access processing value monitoring unit 212 has reached the threshold (S110).

The reset processing unit 214 determines whether the access processing value in the CM#0 measured by the access processing value monitoring unit 212 has reached the threshold (S120).

If the access processing value in the CM#0 measured by the access processing value monitoring unit 212 has reached the threshold (Yes in S120), the reset processing unit 214 performs a reset for measurement of the number of abnormalities and the access processing value in the CM#0 (S130), and the process proceeds to S140.

If the access processing value in the CM#0 measured by the access processing value monitoring unit 212 has not reached the threshold (No in S120), the process directly proceeds to S140.

The reset processing unit 214 determines whether the access processing value in the CM#1 measured by the access processing value monitoring unit 212 has reached the threshold (S140).

If the access processing value in the CM#1 measured by the access processing value monitoring unit 212 has reached the threshold (Yes in S140), the reset processing unit 214 performs a reset for measurement of the number of abnormalities and the access processing value in the CM#1 (S150), and the process proceeds to the next operation.

If the access processing value in the CM#1 measured by the access processing value monitoring unit 212 has not reached the threshold (No in S140), the process proceeds to a determination process for the next component.

Then, the reset processing unit 214 similarly performs the determination process and the resetting process for the router#0, the router#1, the storage device#0, and the storage device#1.

Additionally, the reset processing unit 214 determines whether the access processing value in the storage device#2 measured by the access processing value monitoring unit 212 has reached the threshold (S160).

If the access processing value in the storage device#2 measured by the access processing value monitoring unit 212 has reached the threshold (Yes in S160), the reset processing unit 214 performs a reset for measurement of the number of abnormalities and the access processing value in the storage device#2 (S170), and the process proceeds to S180.

If the access processing value in the storage device#2 measured by the access processing value monitoring unit 212 has not reached the threshold (No in S160), the process directly proceeds to S180.

Then, resetting is completed (S180) and the exemplary resetting process is completed.

Figure 5:
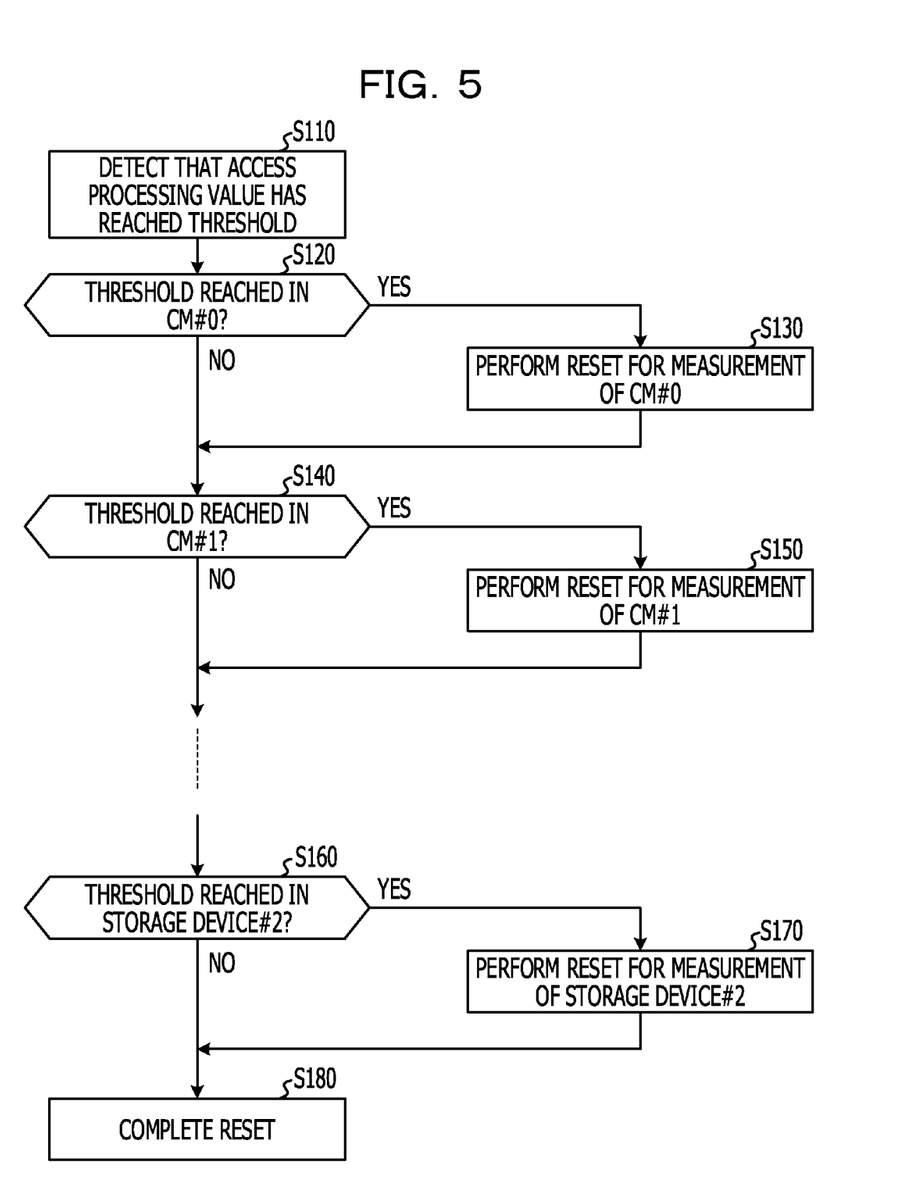
FIG. 5 is a flowchart illustrating a process of resetting numbers of abnormalities and access processing values in a storage system according to an embodiment.

Note that the order of determinations made by the reset processing unit 214 as to whether the access processing value has reached the threshold (S120, S140, . . . , and S160) is not limited to the example illustrated in FIG. 5. The reset processing unit 214 may make determinations in the order of S160, . . . , S140, and S120, for example.

In this way, the storage system 1 according to the first embodiment may offer advantages described below.

That is, even when abnormalities are detected in a plurality of components because of a fault of one component, the fault location may be identified.

For example, if a normal CM#1 and a faulty CM#0 access one normal storage device#0, the faulty CM#0 accesses the normal storage device#0. Therefore, the numbers of abnormalities of the CM#0 and the storage device#0 have the same value. Thus, the fault location is not identified by an approach in which merely the numbers of abnormalities of components where the occurrences of abnormalities have been detected are counted and then one component where the number of abnormalities is large is regarded as the fault location. According to the storage system 1 of the first embodiment, the access processing value monitoring unit 212 also measures access processing values for access from the normal CM#1 to the normal storage device#0. Accordingly, the access processing value in the storage device#0 increases, and the ratio in the storage device#0 decreases. Thus, the fault location identification unit 213 may determine that the ratio of the faulty CM#0 is larger than the ratio of the normal storage device#0, and the fault location may be identified. This may improve the reliability in identification of a fault location.

Also, for example, if one normal CM#0 accesses a plurality of normal storage devices storage device#1 and storage device#2 and a faulty storage device#0, the normal CM#0 accesses the faulty storage device#0. Therefore, merely by counting the numbers of abnormalities of components where the occurrences of abnormalities have been detected, the numbers of abnormalities of the CM#0 and the storage device#0 have the same value, and thus the fault location is not identified. According to the storage system 1 of the first embodiment, the access processing value monitoring unit 212 also measures access processing values for access from the normal CM#0 to the normal storage devices storage device#1 and storage device#2. Accordingly, the access processing value in the CM#0 increases, and the ratio in the CM#0 decreases. Thus, the fault location identification unit 213 may determine that the ratio of the faulty storage device#0 is larger than the ratio of the normal CM#0, and the fault location may be identified. This may improve the reliability in identification of a fault location. In a typical RAID device, the operation is performed in a RAID configuration using a plurality of storage devices, and therefore there are many cases where one CM simultaneously accesses a plurality of storage devices. Accordingly, in the case where one normal CM#0 accesses a plurality of normal storage devices storage device#1 and storage device#2 and a faulty storage device#0, an advantage that a fault location may be identified is particularly effective.

Additionally, even when one faulty CM 20 accesses one normal storage device 50 in a concentrated manner, the ratio in the normal storage device 50 decreases if another normal CM 20 accesses that storage device 50. Then, the fault location identification unit 213 may identify the cause (fault location) of occurrence of a storage device access error. This may improve the reliability in identification of a fault location.

Even when one normal CM 20 accesses one faulty storage device 50, the ratio in the normal CM 20 decreases if access from the normal CM 20 to another normal storage device 50 is performed. Then, the fault location identification unit 213 may identify the cause (fault location) of occurrence of a storage device access error. This may improve the reliability in identification of a fault location.

Resetting the numbers of abnormalities and the access processing values upon an elapse of a predetermined monitoring period makes it difficult to identify a candidate fault location (component) having a low access frequency as the fault location. According to the storage system 1 of the first embodiment, the reset processing unit 214 resets the number of abnormalities and the access processing value in a candidate fault location (component) where the access processing value has reached the threshold, so that a candidate fault location (component) having a low access frequency may be identified as the fault location. This may improve the reliability in identification of a fault location.

OTHER EMBODIMENTS

The disclosed technique is not limited to the first embodiment described above, and may be modified in various forms without departing from the spirit and scope of the first embodiment. The configurations and processes of the embodiments may be selected as desired or may be combined appropriately.

In the first embodiment described above, the CM#1 includes the CPU 21*b*, but the CM#1 is not limited to this. For example, the CM#1 may include the CPU 21*a* as included in the CM#0. This enables a fault location to be identified by the CM#1 even when the CM#0 has a fault.

In the first embodiment described above, the fault location identification unit 213 calculates the ratio by dividing the number of abnormalities by the access processing value in each of candidate fault locations, but the way to calculate the ratio is not limited to this. For example, the fault location identification unit 213 may calculate the ratio by dividing the access processing value by the number of abnormalities in each of candidate fault locations. In this case, the fault location identification unit 213 identifies a candidate location having the smallest ratio, as the fault location.

Additionally, a RAID device has been described in the first embodiment described above; however, embodiments are not limited to this. The first embodiment described above may be applied, for example, to a system in which various electronic devices connected over a communication line such as a network are components.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a plurality of components; and
    a processor configured to:
        measure, upon detection of abnormalities in first components among the plurality of components, a number of abnormalities that occur in the respective first components,
        measure an access processing value in the respective first components, the access processing value representing an amount of a predetermined feature relating to the respective first components,
        calculate a ratio of the number of abnormalities to the access processing value in the respective first components,
        calculate, when the number of abnormalities in each of second components among the first components has reached a threshold, the ratio for each of the second components; and
        identify a component as a fault location based on the calculated ratios.

2. The information processing device according to claim 1, wherein the processor is configured to:
    begin, upon beginning of a measurement of a number of abnormalities in a second component among the plurality of components, the measurement of the access processing value in the second component.

3. The information processing device according to claim 1, wherein the processor is configured to:
    identify as the fault location, among the first components, a component having a largest ratio obtained by dividing the number of abnormalities by the access processing value.

4. The information processing device according to claim 1, wherein the processor is configured to:
    perform, when the access processing value in a second component among the first components has reached a threshold, a reset for the measurement of the number of abnormalities and the access processing value in the second component.

5. The information processing device according to claim 1, wherein
    the access processing value is an amount of data processed by the respective first components.

6. The information processing device according to claim 1, wherein
    the access processing value is a number of commands processed by the respective first components.

7. A control device included in an information processing device including a plurality of components, the control device comprising:
    a processor configured to
        measure, upon detection of abnormalities in first components among the plurality of components, a number of abnormalities that occur in the respective first components,
        measure an access processing value in the respective first components, the access processing value representing an amount of a predetermined feature relating to the respective first components,
        calculate a ratio of the number of abnormalities to the access processing value in the respective first components, calculate, when the number of abnormalities in each of second components among the first components has reached a threshold, the ratio for each of the second components, and identify a component as a fault location based on the calculated ratios.

8. The control device according to claim 7, wherein the processor is configured to:

begin, upon beginning of a measurement of a number of abnormalities in a second component among the plurality of components, the measurement of the access processing value in the second component.

9. The control device according to claim 7, wherein the processor is configured to:

identify as the fault location, among the first components, a component having a largest ratio obtained by dividing the number of abnormalities by the access processing value.

10. The control device according to claim 7, wherein the processor is configured to:

perform, when the access processing value in a second component among the first components has reached a threshold, a reset for the measurement of the number of abnormalities and the access processing value in the second component.

11. The control device according to claim 7, wherein the access processing value is an amount of data processed by the respective first components.

12. The control device according to claim 7, wherein the access processing value is a number of commands processed by the respective first components.

13. A computer-readable recording medium having stored therein a program for causing a computer included in an information processing device to execute a process, the information processing device including a plurality of components, the process comprising:

measuring, upon detection of abnormalities in first components among the plurality of components, a number of abnormalities that occur in the respective first components;

measuring an access processing value in the respective first components, the access processing value representing an amount of a predetermined feature relating to the respective first components;

calculating a ratio of the number of abnormalities to the access processing value in the respective first components;

calculating, when the number of abnormalities in each of second components among the first components has reached a threshold, the ratio for each of the second components; and identifying a component as a fault location based on the calculated ratios.

14. The computer-readable recording medium according to claim 13, the process comprising:

beginning, upon beginning of a measurement of a number of abnormalities in a second component among the plurality of components, the measurement of the access processing value in the second component.

15. The computer-readable recording medium according to claim 13, the process comprising:

identifying as the fault location, among the first components, a component having a largest ratio obtained by dividing the number of abnormalities by the access processing value.

16. The computer-readable recording medium according to claim 13, the process further comprising:

performing, when the access processing value in a second component among the first components has reached a threshold, a reset for the measurement of the number of abnormalities and the access processing value in the second component.

17. The computer-readable recording medium according to claim 13, wherein the access processing value is an amount of data processed by the respective first components.

* * * * *